(12) United States Patent
Robinson

(10) Patent No.: US 10,467,641 B2
(45) Date of Patent: Nov. 5, 2019

(54) MOBILE PROXIMITY-BASED ANALYTICS

(71) Applicant: NCR Corporation, Duluth, GA (US)

(72) Inventor: Lida Robinson, Fort Worth, TX (US)

(73) Assignee: NCR Corporation, Atlanta, GA (US)

( * ) Notice: Subject to any disclaimer, the term of this patent is extended or adjusted under 35 U.S.C. 154(b) by 678 days.

(21) Appl. No.: 14/136,390

(22) Filed: Dec. 20, 2013

(65) Prior Publication Data

US 2015/0178750 A1 Jun. 25, 2015

(51) Int. Cl.
*G06Q 10/00* (2012.01)
*G06Q 30/02* (2012.01)
*H04W 4/02* (2018.01)

(52) U.S. Cl.
CPC ..... *G06Q 30/0205* (2013.01); *G06Q 30/0261* (2013.01); *G06Q 30/0266* (2013.01); *G06Q 30/0268* (2013.01); *H04W 4/02* (2013.01)

(58) Field of Classification Search
CPC .. G06Q 30/02; G06Q 10/063; G06Q 10/0633; G06Q 30/0201
USPC ...................................................... 705/7.34
See application file for complete search history.

(56) References Cited

U.S. PATENT DOCUMENTS

| | | | |
|---|---|---|---|
| 8,611,919 B2 | 12/2013 | Barnes | |
| 8,781,965 B2 * | 7/2014 | Huster | G06Q 20/322 |
| | | | 705/44 |
| 8,880,996 B1 * | 11/2014 | Deshpande | G06Q 30/0255 |
| | | | 715/234 |
| 9,326,105 B2 * | 4/2016 | Pattabiraman | H04W 4/33 |
| 9,374,744 B2 * | 6/2016 | Hwang | H04W 36/0066 |
| 9,524,167 B1 * | 12/2016 | Cohn | G06F 9/30098 |
| 9,754,255 B1 * | 9/2017 | Ma | G06Q 20/40 |
| 2002/0107027 A1 | 8/2002 | O'Neil | |
| 2010/0097239 A1 * | 4/2010 | Campbell | B60R 11/0252 |
| | | | 340/4.4 |
| 2010/0185504 A1 * | 7/2010 | Rajan | G06Q 30/02 |
| | | | 705/14.13 |
| 2010/0268728 A1 | 10/2010 | Tadlock et al. | |
| 2012/0047011 A1 * | 2/2012 | Rippetoe | G06Q 30/02 |
| | | | 705/14.45 |

(Continued)

FOREIGN PATENT DOCUMENTS

| | | |
|---|---|---|
| CN | 101867870 A | 10/2010 |
| CN | 101917665 A | 12/2010 |

(Continued)

OTHER PUBLICATIONS

Hsinchun Chen, Roger H. L. Chiang, Veda C. Storey (Business Intelligence and Analytics: From Big Data to Big Impact, MIS Quarterly vol. 36 No. 4, pp. 1165-1188/Dec. 2012). (Year: 2012).*

(Continued)

*Primary Examiner* — Hafiz A Kassim
(74) *Attorney, Agent, or Firm* — Schwegman, Lundberg & Woessner

(57) ABSTRACT

A geographical position of a mobile device is monitored and when the position is within a configured proximity to an establishment, customized analytics are gathered relevant to the establishment. The analytics dynamically pushed to presentations on the display of the mobile device and to interfaces of the mobile device for viewing and interacting by a user of the mobile device, as the user is at or approaches the establishment.

9 Claims, 4 Drawing Sheets

(56) References Cited

U.S. PATENT DOCUMENTS

| | | | | |
|---|---|---|---|---|
| 2012/0078751 A1* | 3/2012 | MacPhail | | G06Q 20/06 705/26.41 |
| 2012/0116861 A1* | 5/2012 | Dobyns | | G06Q 30/0234 705/14.34 |
| 2012/0197484 A1* | 8/2012 | Nath | | G01S 5/0072 701/32.4 |
| 2012/0260263 A1* | 10/2012 | Edoja | | G06Q 30/02 719/313 |
| 2012/0316902 A1* | 12/2012 | Kumar | | G06Q 10/00 705/7.11 |
| 2012/0316963 A1* | 12/2012 | Moshfeghi | | G06Q 20/20 705/14.58 |
| 2012/0323685 A1* | 12/2012 | Ullah | | G01S 5/02 705/14.53 |
| 2013/0046635 A1 | 2/2013 | Grigg et al. | | |
| 2013/0073387 A1* | 3/2013 | Heath | | G06Q 50/01 705/14.53 |
| 2013/0091452 A1* | 4/2013 | Sorden | | G06F 3/048 715/771 |
| 2013/0107732 A1* | 5/2013 | O'Donnell | | H04W 4/02 370/252 |
| 2013/0173346 A1* | 7/2013 | Odawara | | G06Q 50/26 705/7.34 |
| 2013/0217332 A1* | 8/2013 | Altman | | H04H 60/90 455/41.2 |
| 2013/0262311 A1* | 10/2013 | Buhrmann | | G06Q 20/40 705/44 |
| 2014/0057658 A1* | 2/2014 | Murad | | H04N 21/214 455/456.3 |
| 2014/0279707 A1* | 9/2014 | Joshua | | G06Q 30/0283 705/400 |
| 2015/0066583 A1* | 3/2015 | Liu | | G06Q 30/0255 705/7.29 |
| 2015/0080031 A1* | 3/2015 | Moldavsky | | H04W 4/02 455/456.3 |
| 2015/0080032 A1* | 3/2015 | Moldavsky | | H04W 4/20 455/456.3 |

FOREIGN PATENT DOCUMENTS

| | | |
|---|---|---|
| CN | 102882936 A | 1/2013 |
| WO | WO/2002/013552 | 2/2002 |

OTHER PUBLICATIONS

Yilin Zhao (Mobile Phone Location Determination and Its Impact on Intelligent Transportation Systems, IEEE Transactions on Intelligent Transportation Systems, vol. 1, No. 1, Mar. 2000). (Year: 2000).*

Hsinchun Chen, Roger H. L. Chiang, and Veda C. Storey et al. (Business Intelligence and Analytics: From Big Data to Big Impact, MIS Quarterly vol. 36 No. 4, pp. 1165-1188/Dec. 2012). (Year: 2012).*

* cited by examiner

MOBILE PROXIMITY-BASED ANALYTICS

BACKGROUND

Enterprises have become hyper competitive with one another in the pursuit of customers and customer loyalty. Technological advancements have permitted enterprises to become even more creative in with their efforts to satisfy the customers.

Moreover, technology has also been integrated within enterprises to make the enterprises more operationally efficient and to reduce staffing needs and expenses of those enterprises.

For example, enterprises are leveraging mobile phones of customers to deliver promotions, take surveys, earn loyalty points, and conduct transaction with the enterprise.

In addition, staff or agents of the enterprises can use mobile technology to pull up and access enterprise information by either accessing websites from mobile devices or by utilizing mobile applications on their mobile devices to access the enterprise information.

All this technology has allowed enterprises to capture a variety of new business metrics and analyze those metrics in new ways for purposes of efficiently managing customers and operations of the enterprises. Data can now be collected by a business from virtually all contacts that the business has with a customer, a vendor, a creditor, an inventor, a government agency, software services, physical assets, and other entities, services, and physical assets.

Typically, reports or views of the metrics are pulled from enterprise systems by authorized users for visual inspection and assimilation by those users. In some instances, the metrics are pushed to enterprise interfaces based on: a predefined interval of elapsed time or a predefined date and time.

However, many users (customers and personnel of an enterprise) are in transit somewhere when having relevant metrics would be most useful to them and, therefore the enterprise. That is, people are increasingly mobile these days and are utilizing their mobile devices (phones, tablets, laptops, etc.) with evermore regularity. Still further, users are demanding or expecting that relevant information be available to them 24 hours a day, seven days a week, and 365 days a year.

But, technology advancements still fall far short of having the capabilities to provide relevant information to users without being asked by those users, when and where it may be that the users desire the relevant information or find the relevant information useful.

In some cases, it may even be the case that the users are unaware that relevant information even exists but had they known; they would utilize the relevant information.

SUMMARY

In various embodiments, methods and system for delivery of mobile proximity-based analytics are presented.

According to an embodiment, a method for delivery of mobile-based analytics is provided. Specifically, data that resolves a geographical location of a mobile device is received. Next, at least one analytic is obtained based on the geographical location being in proximity to an establishment. Finally, the at least one analytic is delivered to the mobile device.

DETAILED DESCRIPTION

Figure 1:
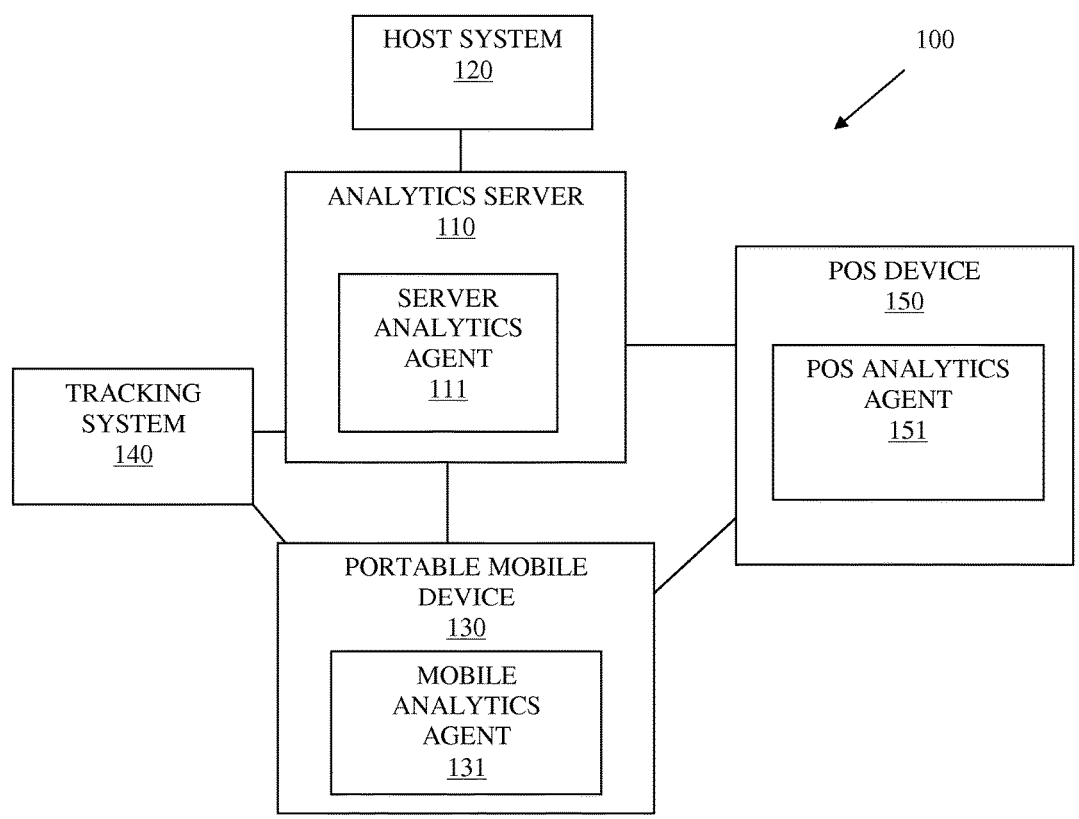
FIG. 1 is a diagram of an example architecture for practicing delivery of mobile based analytics at an enterprise, according to an example embodiment.

FIG. 1 is a diagram of an example architecture 100 for practicing delivery of mobile based analytics at an enterprise, according to an example embodiment. It is to be noted that the analytics server 110 is shown schematically in greatly simplified form, with only those components relevant to understanding of this embodiment being illustrated. The same situation is true for the host system 120, the portable mobile device 130, the tracking system 140, and the Point-Of-Sale (POS) device 150. The various components of the analytics server 110, the host system 120, the customer device 130, the tracking system 140, and the POS device 150, which are not depicted would be readily appreciated and understood by one of ordinary skill the art.

Furthermore, the various components (that are identified in the FIG. 1) are depicted and the arrangement of the components is presented for purposes of illustration only. It is to be noted that other arrangements with more or less components are possible without departing from the mobile proximity-based analytics delivery mechanisms presented herein and below.

The methods and system presented herein and below for delivery of mobile proximity-based analytics can be implemented in whole or in part in one, all, or some combination of the components shown with the architecture 100. The methods and system are programmed as executable instructions in memory and/or non-transitory computer-readable storage media and executed on one or more processors associated with the components.

Specifically, the architecture 100 permits delivery of analytics that are pushed to the portable mobile device 130 of a user while that portable mobile device 130 is detected within a configurable proximity distance of a facility of an enterprise. The delivery can occur via the server analytics agent 111 and/or the POS analytics agent 151, and the delivery is received by the mobile analytics agent 131.

In an embodiment, the portable mobile device 130 includes a geographically positioning mechanism (not shown in the FIG. 1) to provide a current geographical position of the portable mobile device 130, which is then communicated to or monitored by the server analytics agent 111, via the mobile analytics agent 131. In another case, the geographic position is resolved by a tracking system 140, which may be integrated into another device that carries the user of the portable mobile device 130, such as a transportation vehicle that the portable mobile device 130 is in communication with, or alternatively, that the tracking system 140 reports to the server analytics agent 111. In still another situation, the POS analytics agent 150 can detect the geographical position of the portable mobile device 130 when the portable mobile device 130 detects the portable mobile device 130 within a configured proximity of the POS device 150. The POS analytics agent 151 then reports the location of the portable mobile device to the server analytics agent 111.

Once the server analytics agent 111 has determined that the portable mobile device 130 is within a configured proximity distance, the server analytics agent 111 delivers analytics data for presentation and, perhaps, manipulation on a display (not shown in the FIG. 1) of the portable mobile device 130 using an interface (not shown in the FIG. 1) associated with the mobile analytics agent 131.

The analytics are acquired from querying a data store(s), which the analytics server 110 has accessed to. The data store(s) can reside local or external to the analytics server 110. In an embodiment, the server analytics agent 111 using a host interface (not shown in the FIG. 1) to interact with a host system 120 of an enterprise to access the data store(s). Moreover, some data stores may reside local to the analytics server 110, while other data stores reside in (or are only accessible from) the host system 120. In some cases, some of the data stores can also reside within the POS device 150, which are queried via the POS analytics agent 151.

The data store(s) can be queried using a variety of data collected from or mapped to the proximity location detected associated with the portable mobile device 130, such as but not limited to: a mobile device identifier for the portable mobile device 130, a user identifier for a user associated with the mobile device identifier, an identifier associated with an establishment within the proximity location of the portable mobile device 130, a security level associated with the user identifier, and others. It is noted that some or all of the information that is used to search the data store(s) can be dynamically resolved by the server analytics agent 111 based on the mobile device identifier. Results of the search include analytics data that is pushed to the mobile analytics agent 131 on the portable mobile device 130.

Moreover, in some cases, the types of data to return with the results can be defined in profiles for the users. In some cases, the types of data that can be defined within the profiles are based on a security level associated with the user associated with the portable mobile device 130.

The analytics data (may also be referred as just "analytics" herein and below) can include any data that is capable of being produced in reports from the data stores. This can include, but is not limited to: user usage or buying patterns or histories, reviews for services or goods preferred by the user, menu items for an establishment, incentives for goods or services, a map of the establishment, a name of supervisor for the establishment, a photograph for the supervisor, any financial metric associated with the establishment for any configured time period, financial comparisons of the establishment with one or more other establishments, events occurring at the establishment at a time (or any configured period of time) the portable mobile device 130 is within the configured proximity distance, staff on the clock and working at the time the portable mobile device 130 is within the configured proximity distance, photographs for the staff, recent performance reviews or discipline information for the staff, security environment details including documented suspicious activity for the establishment, positive or negative financial/security trends for the establishment, and others.

The various details and embodiments for these techniques, in view of the components within the architecture 100, are now presented with reference to the FIG. 1 within the context of the retail industry. Although, it is to be noted that other embodiments of the invention are not to be strictly tied to the retail industry as any industry, government agency, or organization can benefit from the teachings presented herein to deliver pertinent proximity-based analytics to a portable mobile device 130 of a user as the user physically approaches a particular facility of an establishment.

The architecture 100 includes: an analytics server 110; optionally, a host system 120; a portable mobile device 130; optionally, a tracking system 140; and, optionally, a POS device 150. The analytics server 110 includes an analytics agent 111. The portable mobile device 130 includes a mobile analytics agent 131. The POS device 150 includes a POS analytics agent 151. Each of these components will now be discussed in turn followed by some more detailed operational examples for the architecture 100 of the FIG. 1 within a context relevant to the retail industry.

In an embodiment, the analytics server 110 can be a server 110 that is geographically remote and external to a processing environment associated with the POS device 150 (the server 110 connected in a Wide-Area Network (WAN) with the POS device 150). In some cases for this latter embodiment, the analytics server 110 can be geographically dispersed over multiple network connections but managed as one logical server 110, such as a cloud. In other situations, the analytics server 110 can be contained at one site on one or more machines associated with an enterprise that operates and/or manages the analytics server 110. It is also noted, that the processing associated with gathering the analytics can be processed on behalf of the analytics server 110 by a third-party provider over a network connection on one or more different servers. In some cases, as discussed above and more below, the analytics are provided by a specific enterprise associated with the host system 120 that controls the data relevant to the analytics.

In another case, the analytics server 110 is a local processing environment that is local to the POS device 150 (server 110 connected in a Local Area Network (LAN) with the POS device 150).

The analytics server 110 includes an analytics agent 111. The analytics agent 111 is one or more software module(s) that execute on processors of the analytics server 110.

During operation, the analytics agent 111 receives events sent from one or more of: the mobile analytics agent 131 and the POS analytics agent 151. The presence of an event indicates that the portable mobile device 130 has been detected of being within configured distance of some establishment. The event includes event data that minimally includes a present geographical location of the portable mobile device 130 and a mobile device identifier for the portable mobile device 130. The analytics agent 111 can use the event data to acquire or resolve: a user identifier associated with a user of the portable mobile device 130, an establishment identifier associated with a particular establishment within the configured distance of the portable mobile device 130, a security level associated with the user using the user identifier, a user profile for the user using the user identifier that defines the types of analytics data to acquire for the user, and, optionally, an establishment profile that defines the types of analytics data available for the establishment.

In an embodiment, the event data is a notification sent by the mobile analytics agent 131 when the user initiates the mobile analytics agent 131 on the portable mobile device 130. In another case, the event data is a notification sent by the POS analytics agent 151 when the POS analytics agent 151 detects the mobile portable device 130 in a configured proximity to the POS device 150. In still another case, the event data is provided by a tracking system 140 embedded in a device that is independent of the portable mobile device 130 but associated with it in some manner, such as a transportation vehicle equipped with an active positioning reporting system (tracking system 140) modified to provide the event data as a notification to the server analytics agent 111.

The server analytics agent 111 uses the profile, security level for the user, and the identifiers to identify data sources relevant to the establishment and to formulate one or more queries or instructions to acquire analytics that are customized for the user relevant to the establishment. This can include recent analytics associated with the establishment that may or may not have had a chance to be updated to an enterprise data store, such as establishment specific operational data for the time the portable mobile device 130 comes within the configured proximity of the establishment (this may be recorded by the POS device 150 and some of it may never be updated to the enterprise server associated with the enterprise).

The server analytics server 111 then pushes the dynamically acquired customized analytics for the establishment to the mobile analytics agent 131 of the portable mobile device 130 for presentation on screens of a display of the portable mobile device 130. An interface associated with the mobile device analytics agent 131 can permit the user to interact with and alter the presentation to include: more or less detail, view the detail in different customized manners, and the like.

The host system 120 includes an enterprise processing environment associated with the establishment that the portable mobile device 130 is within a configured proximity to. The host system 120 can include one or more data stores, processing devices or servers, and software services (including data querying and/or report generation).

In an embodiment, the analytics server 110 and the host system 120 are subsumed as a single logical server, which may or may not be at a same physical site. Therefore, in some embodiments, the host system 120 is an optional feature of the architecture 100.

The architecture 100 also includes a portable mobile device 130. In an embodiment, the portable mobile device 130 is a smartphone. In other embodiments, the portable mobile device 130 can be a tablet, a laptop, or a wearable processing device.

The portable mobile device 130 includes the mobile analytics agent 131. The mobile analytics agent 131 is configured to report its current geographic position when it is initiated on the portable mobile device 130. Additionally, in some embodiments, the mobile analytics agent 131 is configured to periodically report its current geographical position. The reporting of the geographical position along with a mobile device identifier for the portable mobile device 130 is made to either the server analytics agent 111 or the POS analytics agent 151.

When the current geographical position is delivered to the server analytics agent 111 (either directly from the mobile analytics agent 131 or indirectly from the POS analytics agent 151), the server analytics 111 delivers customized analytics to the server analytics agent 111 for presentation on a display of the portable mobile device 130 and for interaction by the user via interfaces associated with the mobile analytics agent 131. These mechanisms were presented above with reference to the discussion of the server analytics agent 111.

Another optional component of the architecture is the tracking system 140. The tracking system 140 can be embedded hardware and software associated with a transportation vehicle that is capable of modification to acquire the mobile device identifier from the portable mobile device 130 and transmit the current geographical position of the transportation vehicle and the mobile device identifier for the portable mobile device 130 to the server analytics agent 111. This triggers delivery of customized analytics to the mobile analytics agent 131 as discussed herein and above.

Still another optional component of the architecture 100 is the POS device 150. In an embodiment, the POS device 150 is a standalone terminal that is operated by a cashier. In another case, the POS device 150 is a Self-Service Terminal (SST) operated by a customer. In still another situation, the POS device 150 is a mobile device, such as a tablet. It may also be that the POS device 150 is a local service that services multiple POS terminals or devices 150 at a physical site of an establishment.

The POS device 150 includes a POS analytics agent 151. The POS analytics agent 151 can communicate with the mobile analytics agent 131 and the server analytics agent 111. In an embodiment, the POS analytics agent 151 interacts with the server analytics agent 111 to provide onsite analytics for the establishment that may not be available from the server analytics agent 111. In an embodiment, the POS analytics agent 151 detects a connection made by the portable mobile device 130 to the POS device 150 and based on a known physical location for the POS device 150, the POS analytics agent 151 communicates a mobile device identifier for the mobile device and an identifier for the POS device 150 (from which the geographical proximity of the portable mobile device 130 can be resolved) to the server analytics agent 111. The server analytics agent 111 can then delivered customized analytics to the mobile analytics agent 131 via the mechanisms discussed above.

According to an embodiment, the POS analytics agent 151 acts as an intermediary between the analytics server 110 and the portable mobile device 130. Essentially, as proxy between the two.

A retail example for an embodiment of the architecture 100 is now presented for further illustration.

Consider that an executive of a retail company is traveling and visiting a variety of retail stores operated by the retail company. As the executive approaches within a few miles of a particular store, he/she opens the mobile analytics agent 131 on his phone 130. The mobile analytics agent 131 creates a wireless connection with the analytics server 110 and transmits a current geographical position and a mobile device identifier for the phone 130 to the server analytics agent 111. The server analytics agent 111 uses the mobile device identifier to identify the executive and uses the current position to resolve all nearby stores for the company, if the few miles are within a configured distance or when the current geographical position changes to be within the configured distance, the server analytics agent 111 acquires a profile for the executive and the particular store and uses this to identify the types of data the executive is to see along with identifiers acquired and resolved by the server analytics agent 111 to search or mine a variety of data stores (some local to the analytics server 110, some, perhaps, on the host system 120; and/or some on the POS device 150). Next, the results (customized analytics, such as financial and personnel data) returned are pushed from the server analytics agent 111 to the mobile analytics agent 131 for presentation on the display of the phone 130 and for interaction by the executive via interfaces of the mobile analytics agent 131.

It is noted that this is but one example and other examples and industries may be used without departing from the beneficial teachings presented herein.

One now fully appreciates how the architecture 100 can be utilized to dynamically push relevant customized analytics for a particular establishment to a portable mobile device 130 of a user as the user gets within a configured proximity to that establishment. This can be done without the analytics being requested and without the user formulating any search to acquire the analytics. Moreover, this is done at a time and place that the customized analytics may be desired or needed by the user.

In fact, a myriad of uses can be achieved with the teachings herein where customized analytics are delivered to users based on proximity of the users to establishments for which the customized analytics are relevant.

Figure 2:
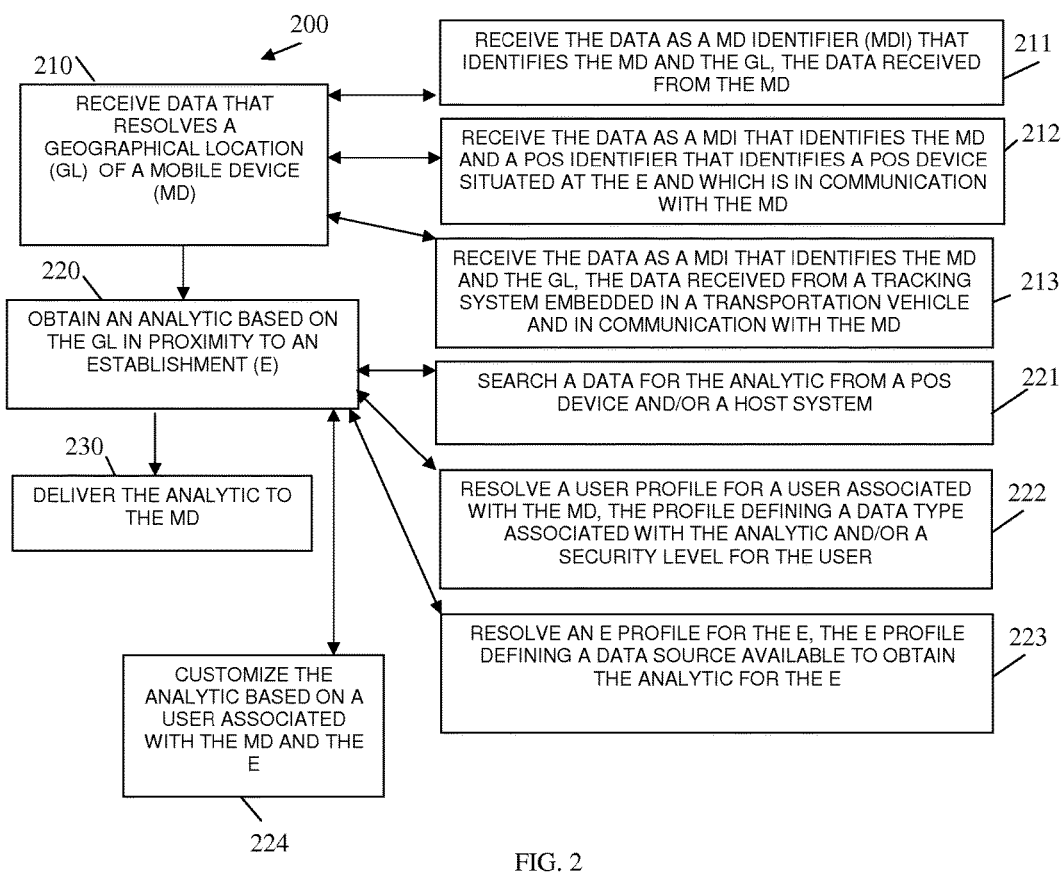
FIG. 2 is a diagram of a method for delivering mobile proximity-based analytics, according to an example embodiment.
Figure 3:
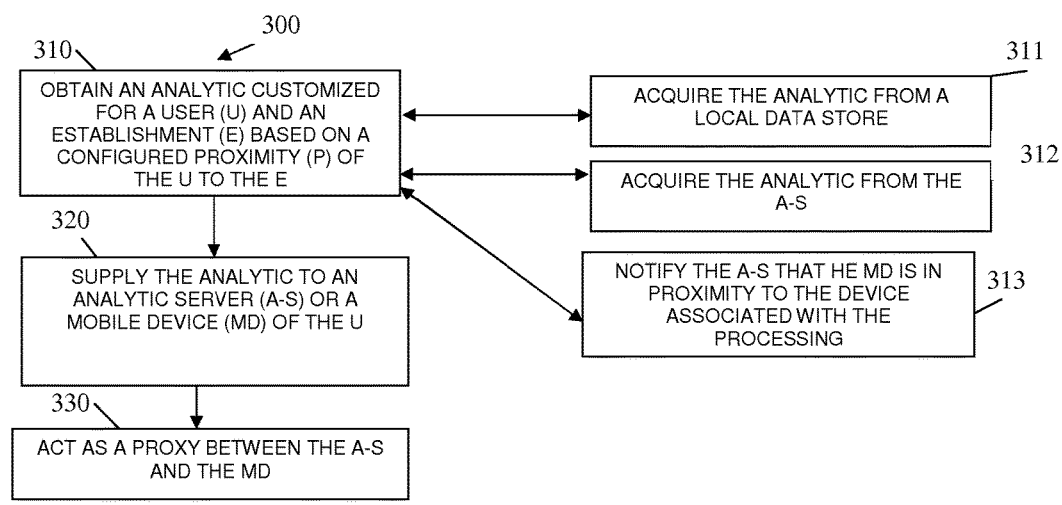
FIG. 3 is a diagram of another method for delivering mobile proximity-based analytics, according to an example embodiment.
Figure 4:
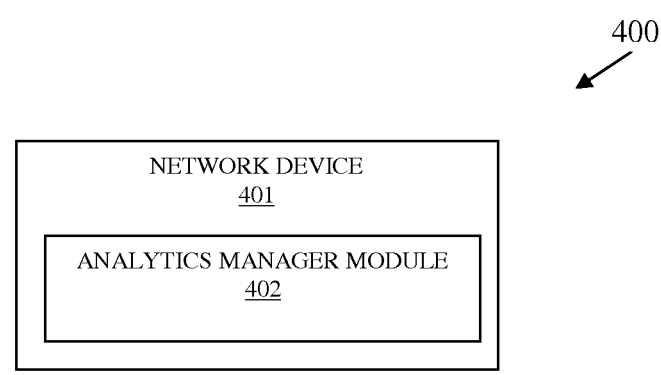
FIG. 4 is a diagram of a mobile proximity-based analytics delivery system, according to an example embodiment.

Some additional embodiments and details and in some cases enhanced perspective of what has already been described are now presented with the discussion of the FIGS. 2-4.

FIG. 2 is a diagram of a method 200 for delivering mobile proximity-based analytics, according to an example embodiment. The software module(s) that implements the method 200 is referred to as a "server customized analytics manager." The server customized analytics manager is implemented as executable instructions programmed and residing within memory and/or a non-transitory computer-readable (processor-readable) storage medium and executed by one or more processors of a device. The processors of the device that executes the server customized analytics manager are specifically configured and programmed to process the server customized analytics manager. The server customized analytics manager has access to one or more networks during its processing. The networks can be wired, wireless, or a combination of wired and wireless.

In an embodiment, the device that executes the server customized analytics manager is a server device, such as server device 110 presented above with respect to architecture 100 of the FIG. 1. The server device 110 can be a server local to one or more POS devices of an establishment or remove from the one or more processing devices of the establishment. Moreover, the server device 110 can be a processing environment that includes multiple different devices that are geographically dispersed from one another; the processing environment logically organized as a cloud processing environment.

Moreover, in an embodiment, the server customized analytics manager is the server analytics agent 111 of the FIG. 1.

At 210, the server customized analytics manager receives data that resolves a geographical location of a mobile device. The data can, at least partially, include the actual geographical location or in some cases an identifier that is mapped to a particular device whose geographical location is known.

So, in an embodiment, at 211, the server customized analytics manager receives the data as a mobile device identifier that identifies the mobile device and the geographical location for the mobile device. In this case, the data is received from the mobile device. This situation was described above with reference to the FIG. 1.

In another case, at 212, the server customized analytics manager receives the data the mobile device identifier and a POS identifier for a POS device that is situated at the establishment and which is in communication with the mobile device. This embodiment was also described above with reference to the FIG. 1.

According to an embodiment, at 213, the server customized analytics manager receives the data as the mobile device identifier and the geographical location. The data received by a tracking system embedded in or affixed to a transportation vehicle and in communication with the mobile device (discussed with reference to the FIG. 1).

At 220, the server customized analytics manager obtains an analytic based on the geographical location being in proximity to an establishment. The types of analytics were described above, by way of examples in the discussion of the FIG. 1.

In an embodiment, at 221, the server customized analytics manager searches one or more data stores for the analytic. The data store(s) located on the POS device 150, a host system 120, and/or an analytic server 110 that executes the server customized analytics manager.

In another case, at 222, the server customized analytics manager resolves a user profile for a user associated with the mobile device. The profile defines data type(s) associated with the analytic and/or a security level associated with access by the user.

According to an embodiment, at 223, the server customized analytics manager resolves an establishment profile for the establishment where the establishment profile defines data source(s) available to obtain the analytic for the establishment.

In still another circumstance, at 224, the server customized analytics manager customizes the analytic based on a user associated with the mobile device and the establishment. This was discussed above with reference to the FIG. 1.

At 230, the server customized analytics manager delivers the analytic to the mobile device. This is a dynamic push from the server customized analytics manager to the mobile device (mobile analytics agent 131 of the FIG. 1). Interfaces can be used by the user to interact with the analytic on the mobile device and presentations of the analytic can be made on a display of the mobile device.

FIG. 3 is a diagram of another method 300 for delivering mobile proximity-based analytics, according to an example embodiment. The software module(s) that implements the method 300 is referred to as a "POS customized analytics manager." The POS customized analytics manager is implemented as executable instructions programmed and residing within memory and/or a non-transitory computer-readable (processor-readable) storage medium and executed by one or more processors of a POS device. The processors of the POS device that executes the POS customized analytics manager are specifically configured and programmed to process the POS customized analytics manager. The POS customized analytics manager has access to one or more networks during its processing. The networks can be wired, wireless, or a combination of wired and wireless.

In an embodiment, the POS device that executes the POS customized analytics manager, such as POS device 150 presented above with respect to architecture 100 of the FIG. 1. The POS device can be local to the processing environment of the server device 110 of the FIG. 1 or can be remote to the local processing environment of the server device 110 of the FIG. 1.

In an embodiment, the POS device is a standalone cashier-assisted terminal or a SST operated by a customer. In an embodiment, the POS device is a sever that services multiple different instances of the POS customized analytics manager operating on each POS device. According to an embodiment, the POS device is a mobile device carried around a particular establishment.

In an embodiment, the POS customized analytics manager is the POS analytics agent 131 of the FIG. 1.

At 310, the POS customized analytics manager obtains an analytic that is customized for a user and an establishment based on a configured proximity of the user to the establishment. So, the identity of the user and the establishment determines what analytic obtained for the user.

In an embodiment, at 311, the POS customized analytics manager includes acquires the analytic from a local data store that is local to the processing environment of the device that is executing the POS customized analytics manager.

According to an embodiment, at 312, the POS customized analytics manager acquires the analytic from an analytic service, such as analytic server 110 of the FIG. 1.

In yet another situation, at 313, the POS customized analytics manager notifies the analytic server that the mobile device is in proximity to the device that is executing the POS customized analytics manager. It may be that the mobile device makes a connection to the device or that the mobile analytics agent 131 of the mobile device 130 scans a bar code (or Quick Response (QR) code) that is sent to the POS customized analytics manager, or other mechanisms for the POS customized analytics manager to become aware that the mobile device is in a configured proximity to the establishment.

At 320, the POS customized analytics manager supplies the analytic to an analytic server (such as analytic server 110) or supplies the analytic to the mobile device (such as mobile device 130) of the user.

According to an embodiment, at 321, the POS customized analytics manager acts as a proxy between the analytic server 110 and the mobile device 130. This was discussed with reference to the FIG. 1.

FIG. 4 is a diagram of a mobile proximity-based analytics delivery system 400, according to an example embodiment. The mobile proximity-based analytics delivery system 400 is programmed and resides within memory and/or a non-transitory computer-readable medium and execute on one or more processors of one or more devices. The mobile proximity-based analytics delivery system 400 has access and can communicate over one or more networks; and the networks can be wired, wireless, or a combination of wired and wireless.

The mobile proximity-based analytics delivery system 400 includes a network device 401 having an analytics manager module 402 programmed within memory and/or a non-transitory computer-readable storage media as executable instructions of the network device 401.

In an embodiment, the network device 401 is a standalone POS device.

In an embodiment, the network device 401 is a portion of a POS device.

In another embodiment, the network device 401 is a device that processes in an environment entirely independent, external, and separate from a POS device.

According to an embodiment, the network device 401 is the service device 110 of the FIG. 1 and the analytics manager module 402 is the server analytics agent 111 of the FIG. 1.

The analytics manager module 402 is configured to dynamically push an analytic to a mobile device based on proximity of the mobile device to the establishment (as discussed above with reference to the FIGS. 1-3).

In an embodiment, the analytics manager module 402 is further configured to receive a geographical position for the mobile device from the mobile device, a POS device situated within the establishment, or a tracking system.

In another case, the analytics manager module 402 is further configured to acquire the analytic from data store(s) associated with the POS device, a host system associated with the establishment, and/or a local data source that is local to the network device 401.

In an embodiment, the analytics manager module 402 is further configured to dynamically define a data type for the analytic based on a mobile device profile for the mobile device, an establishment profile for the establishment, and/or a user profile associated with a user of the mobile device.

In yet more cases, the analytics manager module 402 is further configured to identify the establishment based on a current geographical location of the mobile device.

In an embodiment, the analytics manager module 402 is further configured to customize the analytic based on a security level associated with a user of the mobile device.

One now appreciates how a customized analytics can be acquired based on a user of a mobile device and an establishment. The customized analytics delivered in near-real time to the mobile device when it is detected that the mobile device is within a configured proximity to the establishment. The customized analytics presented on displays of the mobile device and available for the user to interact with using interfaces of the mobile device to view and assimilate the analytics while at or while approaching the establishment.

It should be appreciated that where software is described in a particular form (such as a component or module) this is merely to aid understanding and is not intended to limit how software that implements those functions may be architected or structured. For example, modules 131 and 134 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, via a device, data that resolves a geographical location of a mobile device, and wherein receiving further includes receiving the data as a mobile device identifier that identifies the mobile device and the geographical location, the data received from a modified tracking system to send event data as a notification to the device, and the modified tracking system embedded in or affixed to a transportation vehicle and in communication with the mobile device, wherein receiving further includes obtaining a user identifier for a user associated with the mobile device based on the mobile device identifier, obtaining a profile associated with the user based on the user identifier, obtaining a security level associated with the user based on the user identifier, and obtaining an establishment identifier associated with an establishment based on the geographic location;

obtaining, via the device, at least one analytic based on the geographical location being in proximity to the establishment by identifying data sources available to the user based on the profile, the security level, the user identifier, and the establishment identifier, and wherein obtaining further includes querying the data stores that are local to the device and available from a Point-Of-Sale (POS) device of the establishment and returning types of data for the at least one analytic defined in the profile for the user as preferred by the user, wherein querying further includes querying a first data store that resides on the POS device, querying a second data store that is local to the device, and querying a third data store through a host system with the third data store external to the device and the POS device, and wherein querying the first data store further includes obtaining with the at least one analytic establishment operational data from the POS device that has not had a chance to be updated to an establishment data store associated with the establishment; and delivering, via the device, the at least one analytic to an interface of the mobile device controlled by a mobile agent that executes on the mobile device and the interface permitting user interaction for obtaining a user-selected detail for the at least one analytic for viewing on the mobile device by the user, and wherein delivering further includes providing the at least one analytic without the user operating the mobile device making any request for the at least one analytic.

2. The method of claim 1, wherein receiving further includes receiving the data with a Point-Of-Sale (POS) identifier for the POS device situated at the establishment and which is in communication with the mobile device.

3. The method of claim 1 wherein obtaining further includes resolving the profile for the user associated with the mobile device, the profile defining one or more of:
at least one data type associated with the at least one analytic and the security level for the user.

4. The method of claim 1, wherein obtaining further includes resolving an establishment profile for the establishment, the establishment profile defining at least one data source available to obtain the at least one analytic for the establishment.

5. The method of claim 1, wherein obtaining further includes customizing the at least one analytic based on the user associated with the mobile device and the establishment.

6. A system, comprising:
a network device configured to facilitate execution of a analytics manager module; and wherein the analytics manager module is configured to dynamically push at least one analytic to an interface of a mobile device controlled by a mobile agent executing on the mobile device and the at least one analytic dynamically pushed based on proximity of the mobile device to an establishment, and wherein the interface permitting user interaction for obtaining a user-selected detail for the at least one analytic for viewing on the mobile device by a user, and wherein the at least one analytic dynamically pushed without the user operating the mobile device making any request for the at least one analytic, and wherein data stores are identified based on: a user identifier for the user, an establishment identifier for the establishment, a profile associated with the user, and a security level associated with the user, wherein the data stores are queried that are local to the network device and available from a Point-Of-Sale (POS) device of the establishment, and wherein a first data store of the data stores is queried and resides on the POS device, and wherein a second data store of the data stores is queried and resides on the network device, and wherein a third data store of the data stores is queried through a host system that is external to both the POS device and the network device, and wherein the at least one analytic includes operational data obtained from the POS device that has not had a chance to be updated to an establishment data store associated with the establishment, and wherein types of data for the at least one analytic that are returned and defined in the profile for the user as preferred by the user; and the analytics manager module is further configured to receive a notification on a geographical position for the mobile device from a modified tracking system to send event data as a notification to the network device, and the modified tracking system embedded in or affixed to a transportation vehicle and in communication with the mobile device.

7. The system of claim 6, wherein the analytics manager module is further configured to dynamically define at least one data type for the at least one analytic based on at least one of: a mobile device profile associated with the mobile device, an establishment profile associated with the establishment, and the profile associated with the user of the mobile device.

8. The system of claim 6, wherein the analytics manager module is further configured to identify the establishment based on a current geographical location of the mobile device.

9. The system of claim 6, wherein the analytics manager module is further configured to customize the at least one analytic based on the security level associated with the user of the mobile device.

* * * * *